United States Patent
Hofmann et al.

(10) Patent No.: US 6,519,581 B1
(45) Date of Patent: Feb. 11, 2003

(54) COLLECTION OF INFORMATION REGARDING A DEVICE OR A USER OF A DEVICE ACROSS A COMMUNICATION LINK

(75) Inventors: William D. Hofmann, Berkeley, CA (US); John C. Hurley, Sanata Clara, CA (US)

(73) Assignee: Alset, Inc, Palo Alto, CA (US)

( * ) Notice: Subject to any disclaimer, the term of this patent is extended or adjusted under 35 U.S.C. 154(b) by 0 days.

(21) Appl. No.: 09/844,858

(22) Filed: Apr. 27, 2001

Related U.S. Application Data (63) Continuation of application No. 09/017,112, filed on Jan. 31, 1998, now Pat. No. 6,236,983.

(51) Int. Cl.$^7$ ................................................ G06F 7/00
(52) U.S. Cl. ............................ 706/47; 706/45; 706/46
(58) Field of Search .............................. 706/45, 46, 47, 706/52, 61; 707/101, 102

(56) References Cited

U.S. PATENT DOCUMENTS

| | | | |
|---|---|---|---|
| 5,185,860 A | * | 2/1993 | Wu ............................ 709/224 |
| 5,555,346 A | * | 9/1996 | Gross et al. ................... 706/45 |
| 5,586,025 A | * | 12/1996 | Tsuji et al. ..................... 707/50 |
| 5,727,174 A | * | 3/1998 | Aparicio et al. ............. 345/348 |
| 5,877,759 A | * | 3/1999 | Bauer .......................... 345/339 |
| 5,944,783 A | * | 8/1999 | Nieten ......................... 709/202 |

OTHER PUBLICATIONS

Elofson "intelligent agents extend knowledge base system feasibility", IBM system Journal vol. 34, No. 1, pp 78–95.*

Hilbert et al "Agents for collecting application usage data over the internet", ACM Autonomous agents, pp 149–156.*

Hofmann et al, "Mobile agents on the digital battlefield", ACM Autonomous agents, pp 219–225.*

Hu et al, "Discovery of decision rules in relational databases: a rough set approach", ACM CIKM pp 392–400.*

Adomavicius et al, "User profiling in personalization applications through rules discovery and validation", ACM KDD pp 377–381.*

Shyu et al, "Discovering quasi equivalance relationship from database system", ACM CIKM pp 102–108.*

Rosset et al. "Discovery of fraud rules to telelcommunication challenges and soluctions" ACM KDD pp 409–413.*

* cited by examiner

Primary Examiner—Anil Khatri
(74) Attorney, Agent, or Firm—Lisa N. Benado (57) ABSTRACT

A system is provided for collecting information regarding a device or a user of a device. Information is collected from a discovery agent residing on the computer system. At certain times, the agent may be activated to collect the information. A sender transmits a discovery rule across a communication link to a computer system. The discovery agent and the discovery rule are separate code sequences or separate programs. The discovery rule is then applied to the information received from the discovery agent and the resulting information is returned back to the sender. Where the sender receives a user request, such as regarding the computer system, the discovery rule may be transmitted and the sender may use the resulting information to respond to the user request.

47 Claims, 6 Drawing Sheets

| Discovery Agent Name | Data Collected by Discovery Agent | Invoke Interval |
|---|---|---|
| HWConfiguration | ProcessorMfr, ProcessorModel, ProcessorSpeed, RAMSize, ConnectedDevices | 5 min. |
| DiskDriveInfo | DiskCapacity, DiskRemovable, UnusedDiskSpace | 1 min. |
| MemoryInfo | UnusedRAM, CacheUsage, LargestContiguousBlock | 5 sec. |
| SWConfiguration | OperatingSystem, OpSysVersion, SoftwareList | 5 min. |
| ActiveWindows | OpenWindows, FrontTitle, FrontPosition, FrontSize, FrontType | 10 sec. |
| PersonalInfo | Hobbies, VacationPreference, Occupation, Gender | 5 sec. |

| Discovery Rule Name | Data Required to Execute Discovery Rule |
|---|---|
| DiskDriveStatus | DiskCapacity, UnusedDiskSpace |
| SystemStatus | UnusedDiskSpace, UnusedRAM, LargestContiguousBlock, OpenWindows |
| UpgradeWindow | OpenWindows, FrontTitle |
| GolfGamers | Hobbies, SoftwareList |

COLLECTION OF INFORMATION REGARDING A DEVICE OR A USER OF A DEVICE ACROSS A COMMUNICATION LINK

RELATED APPLICATION

This is continuation of application Ser. No. 09/017,112, now U.S. Pat. No. 6,236,983, filed Jan. 31, 1998.

FIELD OF THE INVENTION

The present invention relates to information collection systems. More specifically, the invention provides a system for collecting information regarding a device or a user of a device.

BACKGROUND

Different types of systems and procedures are available for collecting or retrieving information from a device or a user of a device. The collected information may be used to analyze system performance, identify existing problems, or identify potential problems. If a problem or potential problem is identified, a user or administrator of the system is notified of the problem and can take an appropriate action.

Existing procedures for collecting or retrieving information are typically contained in a software application or a built-in diagnostic routine that performs one or more procedures to monitor specific portions of a system. Generally, these procedures are included in a single application or a diagnostic routine that retrieves information about the system and analyzes the retrieved information. Therefore, these procedures retrieve a particular set of information and perform a particular analysis on the information.

These existing applications or diagnostic routines are not easily modified if a user or administrator wants to change the information retrieved or change the analysis performed on the retrieved information. To make such a change requires modifying the application source code or modifying the built-in diagnostic routine, both of which can be complicated and time-consuming.

Additionally, many existing applications are invoked and operated by a user of the system. Instead of running automatically or running in a "background" mode, these applications are executed at the direction of the user. Thus, to retrieve data about the system using this type of application, the user must install the application and know how to operate and command the application. If the application is used infrequently (e.g., only when a problem occurs), the user is not likely to be proficient when operating the application. In this situation, the user may need to re-learn the operation of the application before retrieving and analyzing data about the system.

It is therefore desirable to provide a system that collects information automatically while requiring minimal interaction with the user of the system. Additionally, it is desirable to provide an information collection system that is easily modified to collect different types of data and perform different operations on the collected data.

SUMMARY OF THE INVENTION

Embodiments of the present invention provide a system for passively and actively collecting information about a device, such as a computing device and/or the user of the device. The system uses one or more discovery agents to collect information about a device or its user. The discovery agents do not have intelligence to understand the collected information. Instead, the discovery agents communicate the collected information to a discovery engine, which receives collected data from the discovery agents and applies discovery rules to the collected data. The discovery rules determine what, if any, action is to be taken based on the collected data.

In one embodiment, the discovery rule is transmitted across a communication link to a computer system and the resulting information, e.g. analysis and collected information, is received back from the computer system through the link. In some instances, the sending of the discovery rule may be due to a user request. At times, the sender of the request is a remote individual. For example, the request may be a request for assistance made to a technical support representative or sales representative. In this case, the collected information/analysis information may be used to provide a respond to the user request.

In still other embodiments, the discovery rule is transmitted automatically, when the computer system establishes a connection with a server.

In particular embodiments of the invention receives information from a discovery agent, which collects information when activated. The discover agents may be periodically activated to collect information. The invention determines a discovery rule to be applied to the information received from the discovery agent. The discovery rule is then applied to the information received from the discovery agent. The discovery agent and the discovery rule are separate code sequences.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present invention provides a system for passively and actively collecting information about a device, such as a computing device and/or the user of the device. The system uses one or more discovery agents (implemented using individual programs or code sequences) to collect information about a device or its user. The discovery agents themselves have no intelligence regarding how to interpret or act on the collected data. Instead, the discovery agents merely communicate the collected data to a discovery engine, which is a central control module for the information collection system. The discovery engine receives collected data from the discovery agents and applies one or more discovery rules to the collected data. The discovery rules determine what, if any, action is to be taken based on the collected data. As discussed below, the discovery rules may be a series of Boolean operations, mathematical equations, or other comparisons or evaluations of the collected data.

The discovery agents are separate programs (or code sequences) from the discovery rules, and there is no particular relationship between the discovery agents and the discovery rules. A particular discovery agent may collect data that is used by one or more discovery rules. Similarly, a particular discovery rule may use data collected by one or more discovery agents. Thus, if a particular piece of data collected by a discovery agent is used by multiple discovery rules, that data need only be collected once, rather than retrieving the required data multiple times (once for each discovery rule requiring the information). The discovery engine is responsible for determining what data is required by a particular discovery rule and activating the appropriate discovery agents to collect the required data.

Since the discovery agents and the discovery rules are not linked to one another, new discovery agents can be generated and existing discovery agents can be modified without necessarily requiring a corresponding change to the existing discovery rules. Similarly, an existing discovery rule can be changed or an additional rule added without necessarily making any changes to the existing discovery agents. For example, a new discovery rule may be created that uses data from existing discovery agents. In this situation, no additional discovery agents are required to implement the new discovery rule. Thus, the operation of the information collection system can be modified without requiring a revision of all agents and rules contained in the system.

The updating of discovery agents and discovery rules can be accomplished by downloading agents or rules from a server or other device, or installed from a diskette or other storage medium. In one embodiment of the invention, new or revised agents and rules are downloaded automatically from a server to the device when the device establishes a connection with the server. This embodiment updates the agents and rules without requiring any user interaction or user control. Since the discovery agents and discovery rules are separate programs or code sequences, individual agents and rules can be communicated across a common data communication link, without requiring a high-speed or high-bandwidth communication link.

Particular embodiments of the invention allow an individual, such as a technical support representative or a sales representative, to download a particular discovery agent or discovery rule to a client across a communication link, without requiring action by the user of the client. In a particular example, the user of a client requests assistance from a technical support representative. The technical support representative can then download discovery agents and discovery rules that collect and analyze information about the client system. This collected information and analysis is communicated back to the technical support representative for use in providing assistance to the user of the client.

Figure 1:
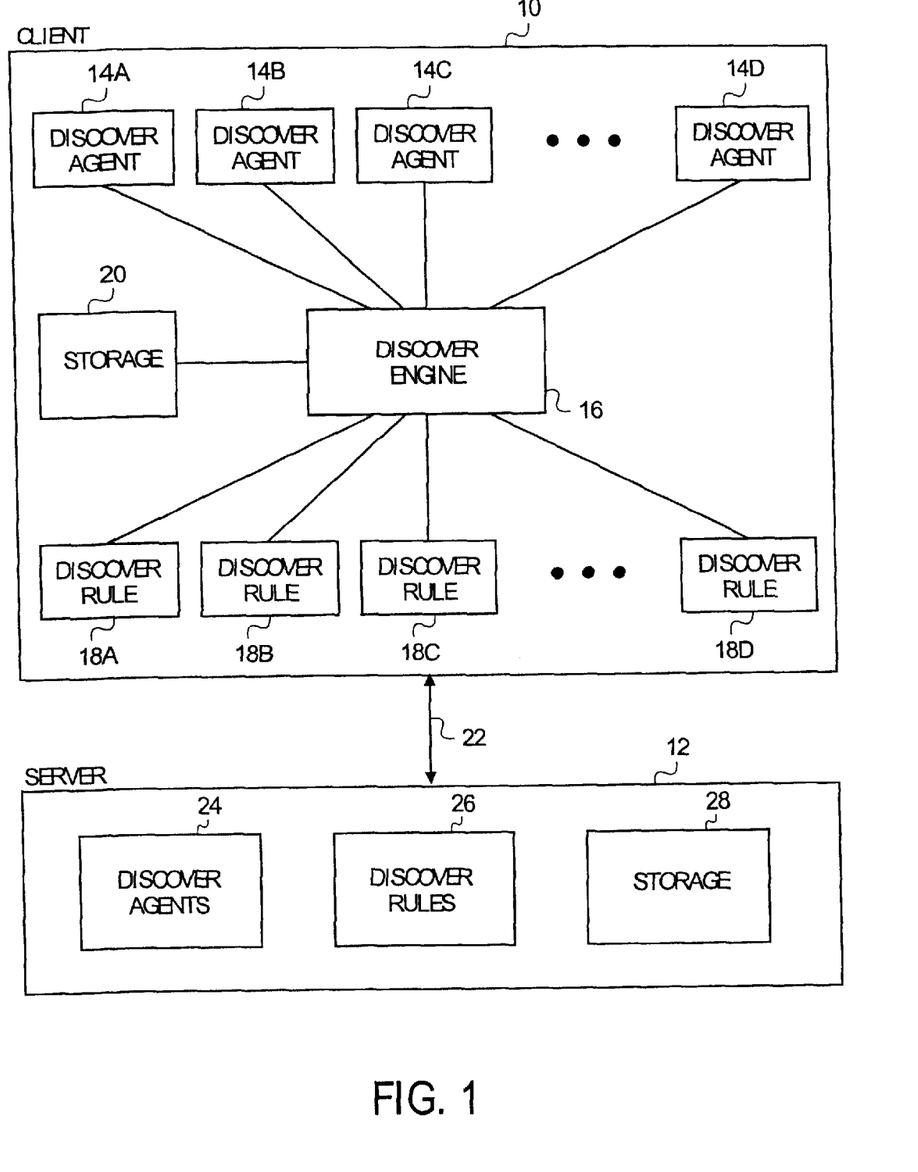
FIG. 1 illustrates an embodiment of a client and a server capable of implementing the teachings of the present invention.

FIG. 1 illustrates an embodiment of a client 10 and a server 12 capable of implementing the teachings of the present invention. Client 10 includes multiple discovery agents 14a, 14a, 14c, and 14d. Although FIG. 1 illustrates four discovery agents, a particular client may include any number of discovery agents. Each discovery agent 14a–4d is coupled to a discovery engine 16 and is capable of communicating information from the discovery agent to the discovery engine. Discovery agents 14a–14d collect information about the client or the user of client 10. The information collected may include the hardware and software configuration of client 10 and the hobbies or personal interests of the user of client 10. As discussed in greater detail below, discovery engine 16 is responsible for activating particular discovery agents, thereby causing the activated agents to collect data about client 10 or the user of client 10. The information collected by discovery agents 14a–4d is communicated to discovery engine 16. A particular set of discovery agents may be installed on client 10 by the manufacturer as part of the manufacturing process. Additional discovery agents can be downloaded or otherwise installed on the client in the future to perform additional data collection operations. Similarly, additional discovery rules can be installed on the client in the future to perform additional analysis.

Client 10 also contains multiple discovery rules 18a, 18b, 18c, and 18d. Although four discovery rules are illustrated in FIG. 1, a particular client 10 may include any number of discovery rules. Additionally, the number of discovery rules need not correspond to the number of discovery agents. As discussed above, the discovery rules and the discovery agents are independent of one another. Discovery engine 16 receives data collected from one or more discovery agents 14a–14d and uses the received data to execute one or more discovery rules 18a–18d. A particular discovery rule may require one or more data elements retrieved from one or more discovery agents 14a–14d. As discussed below, a discovery rule may compare the collected data to a predetermined value or threshold value, or may compare one collected data value to another collected value. A particular discovery rule may contain Boolean expressions, mathematical equations or other data operation or data comparison. The result of a particular discovery rule may store the received data, invoke another discovery rule, or combine the received data with previously stored data (e.g., performing data averaging). An exemplary discovery rule is provided below:

IF
   StorageMediaConfig.StorageMediaList[i]
     .AvailableSpace<50 MB AND
   NOT StorageMediaConfig.StorageMediaList[i]
     .IsRemovable
THEN
   increment profile.system.devices.fixedmedia.lowerWaterMarkCount Additionally, the result of a particular discovery rule may trigger one or more activities or events. For example, a particular discovery rule may generate a warning to the user of client 10 if the available disk space or available memory falls below a particular threshold. In this situation, the discovery rule will receive collected data regarding the available disk space and the available memory in client 10. That data is initially collected by discovery engine 16 from one or more discovery agents 14a–14d. The discovery rule then compares the collected data to its predetermined thresholds. If the available disk space or the available memory falls below the predetermined threshold, then a warning is generated and displayed or otherwise provided to the user of client 10. If the available disk space and the available memory are above the predetermined threshold, then the rule may complete execution without causing the occurrence of any particular activity or operation.

Client 10 also includes a storage mechanism 20 coupled to discovery engine 16. Storage mechanism 20 can be used to store various tables and other configuration information used by discovery engine 16 during its regular operation. Additionally, storage mechanism 20 may store data generated during execution of one or more discovery rules.

Client 10 is coupled to server 12 using a communication link 22. Communication link 22 can be any type of communication link using any type of communication medium. In a particular embodiment of the invention, client 10 and server 12 are coupled to one another across a network, such a local area network (LAN), a wide area network (WAN), or the Internet. Server 12 includes one or more discovery agents 24, one or more discovery rules 26, and a storage mechanism 28. Although server 12 contains discovery agents 24 and discovery rules 26, the server does not necessarily activate the discovery agents or execute the discovery rules. Instead, the server stores various discovery agents 24 and discovery rules 26 for transmission to one or more clients, which are then activated or executed by the discovery engine contained in the client.

Storage device 28 in server 12 can be used to store various information regarding the clients coupled to the server and the various discovery rules and discovery agents already installed on each client. In a particular embodiment of the invention, storage device 28 also maintains the particular version of each discovery agent and discovery rule installed on each client. A typical server 12 is coupled to multiple clients 10. Although multiple clients 10 may be coupled to server 12, only particular clients may contain discovery agents, discovery rules and a discovery engine for coordinating the collection of data. Any number of clients 10 coupled to server 12 may be capable of implementing the information collection system of the present invention. A particular client 10 may be coupled to multiple servers 12 and may receive discovery agents and discovery rules from multiple servers.

FIG. 1 illustrates a particular embodiment of a client capable of implementing an information collection system as described herein. Similarly, server 12 is one embodiment of a server capable of distributing discovery agents and discovery rules to one or more clients. Particular components of client 10 and server 12 are not shown in FIG. 1, for purposes of simplifying the illustration. For example, processors, memory devices, printing devices, and other components and devices commonly used in computer devices are not shown in FIG. 1. However, those of ordinary skill in the art will appreciate that these additional components can be added to client 10 or server 12 without affecting the operation of the invention.

Figure 2:
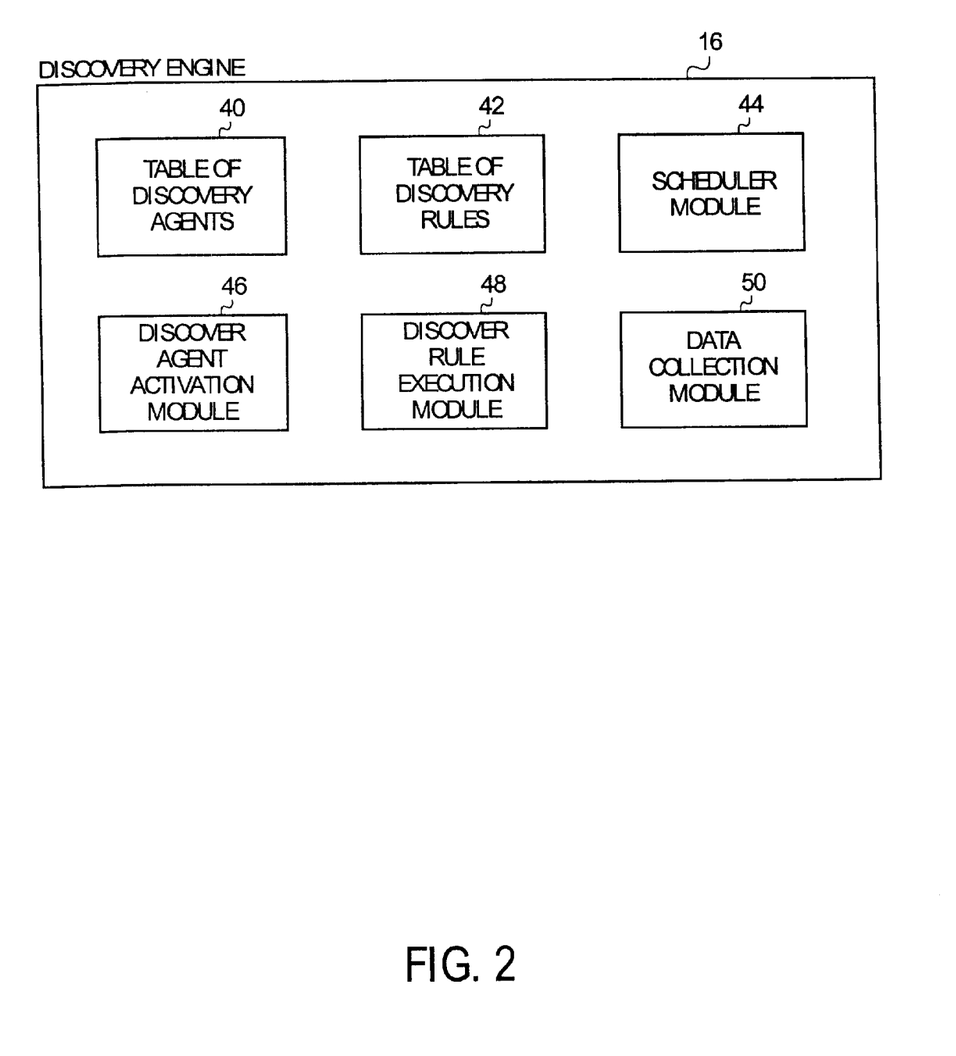
FIG. 2 illustrates an embodiment of a discovery engine that receives data collected by one or more discovery agents and applies one or more discovery rules using the received data.
Figure 3:
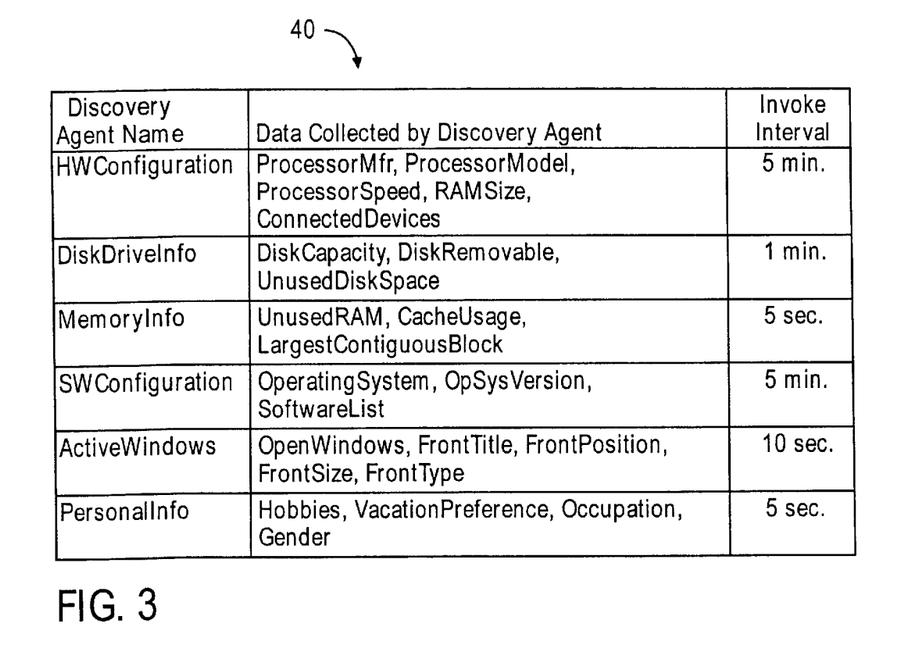
FIG. 3 illustrates an embodiment of a table identifying various discovery agents and the data collected by each discovery agent.

FIG. 2 illustrates an embodiment of a discovery engine 16 that receives data collected by one or more discovery agents and applies the collected data to one or more discovery rules. Discovery engine 16 includes a table of discovery agents 40, which contains information about the various discovery agents contained in the client. Table 40 includes, for example, the name (or other unique identifier) of the discovery agent, the data collected by the discovery agent when the agent is activated, and the typical time interval between activations of the discovery agent. An exemplary table of discovery agents 40 is illustrated in FIG. 3, and discussed below.

Figure 4:
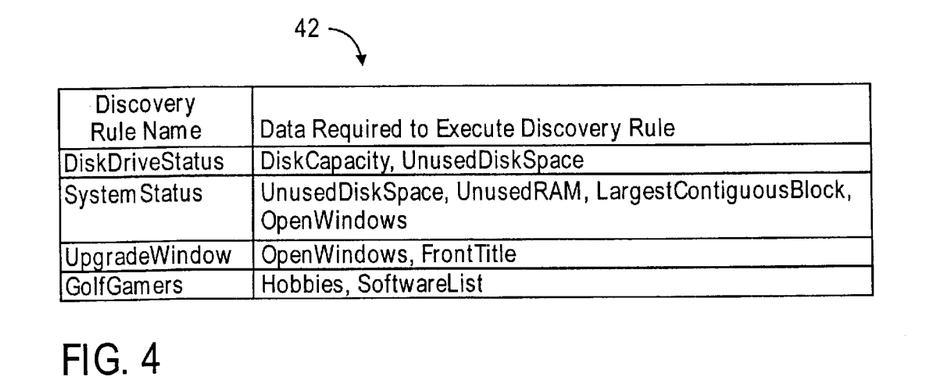
FIG. 4 illustrates an embodiment of a table identifying various discovery rules and the data required to execute each discovery rule.

Discovery engine 16 also includes a table of discovery rules 42. Table 42 contains the name (or other unique identifier) of each discovery rule contained in the client, and information regarding the data required to execute each discovery rule. As discussed above, a particular discovery rule may require one or more data elements, which are collected by one or more discovery agents. An exemplary table of discovery rules 42 is illustrated in FIG. 4, and discussed below.

Discovery engine 16 also includes a scheduler module 44. Particular discovery agents may require activation and periodic time intervals (e.g., activated once every two seconds or once every minute). Scheduler module 44 maintains the information regarding the periodic activation of the discovery agents contained in the client. The scheduler module may maintain its own table or register of information regarding the next activation of each discovery agent, or that information may be stored in the table of discovery agents 40. When a particular discovery agent is scheduled to be activated, scheduler module 44 causes a discovery agent activation module 46 to perform the steps necessary to activate the discovery agent. Additionally, discovery agent activation module 46 may receive requests to activate a particular discovery agent from an external source (such as an activity or an event) other than the expiration of a time interval. These external activities or events may be received from another device coupled to a common network. Additionally, the external activities or events can be generated by the local system (i.e., the device implementing the information collection system). Module 46 is able to determine whether or not a particular discovery agent should be activated when an activation signal is received from scheduler module 44 or another event.

In certain situations, the scheduler module 44 or other event may indicate that a discovery agent should be activated. However, discovery agent activation module 46 may override the activation request based on other factors. For example, the data collected by a particular discovery agent may not be required by any currently active discovery rule. In this situation, although a discovery agent may be scheduled to be activated, any data collected by the discovery agent would not be used. Therefore, the activation of the discovery agent is unnecessary, and module 46 prevents the activation of the discovery agent.

Discovery engine 16 also includes a discovery rule execution module 48, which is used to apply the various discovery rules contained in the client to the data collected by the discovery agents (and received by discovery engine 16). Based on the results of the discovery rule execution, module 48 may activate one or more activities or operations (e.g., displaying a message to the user of the client). Additionally, the results of the discovery rule execution may activate other agents or rules.

Discovery engine 16 also includes a data collection module 50, which receives the data collected by the various discovery agents coupled to discovery engine 16. Data collection module 50 may be a register or other storage device capable of storing the collected data until the discovery rule has been executed. At that time, the data used by the discovery rule is discarded; unless needed by another discovery rule being executed or a discovery rule causes the data to be saved. Generally, after all discovery rules requiring a particular data element have been executed, the data element is discarded. Thus, the collected data from the discovery agents is discarded after the rules have been executed, thereby reducing the storage requirements of the information discovery system.

FIG. 3 illustrates an embodiment of a table of discovery agents 40 that identifies discovery agents and the data collected by each discovery agent. The table illustrated in FIG. 3 contains information regarding six discovery agents. A particular table of discovery agents may contain any number of entries, based on the number of discovery agents contained in the client. For example, a particular information discovery system may contain hundreds or thousands of discovery agents, and a corresponding number of entries in the table of discovery agents.

Referring to the example of FIG. 3, a hardware configuration discovery agent (HWConfiguration) collects data regarding the processor manufacturer, the processor model, the processor speed, the installed memory, and information regarding the various devices contained in or connected to the client. Table 40 also contains information regarding the interval between activations of each discovery agent. In this example, the hardware configuration discovery agent is activated every five minutes. Since the hardware configuration is not likely to change on a frequent basis, the interval between activations of the discovery agent can be relatively large. However, the memory status of the client may change regularly, such that the memory information discovery agent (MemoryInfo) is activated every five seconds.

In an alternate embodiment of table 40, the hardware configuration discovery agent (HWConfiguration) does not collect information regarding the various devices contained in or connected to the client. In this embodiment, the hardware configuration discovery agent may have an activation interval of "once at startup." Since the processor manufacturer, processor model, and processor speed do not generally change while the device is operating, the agent only needs to be activated when the device is powered-up.

The time between discovery agent activations may be contained within the discovery agent itself and communicated to the discovery engine when the discovery agent is initialized or first activated. Thus, the developer of the discovery agent may define the time interval between successive activations of the discovery agent. However, the user or administrator of the client may change the time interval based on their own knowledge of the system or their own requirements or priorities. Therefore, the interval identified in table 40 may not correspond to the interval provided in the discovery agent by the developer of the discovery agent.

The hardware configuration agent and the memory information agent are examples of agents that collect information passively; i.e., without requiring the interaction of the user of the client. These passive agents monitor system activity and system configuration automatically, and collect information without requiring user interaction. Table 40 also contains a personal information agent (PersonalInfo) that contains information regarding the user's hobbies, occupation, and other personal information. This personal information agent is an example of an active discovery agent that collects information actively; i.e., by specifically asking questions of the user through a dialog box or similar mechanism. This type of active discovery agent requires interaction by the user to provide the requested information.

In alternative embodiments of table 40 shown in FIG. 3, each discovery agent contains information regarding whether the discovery agent is currently active (i.e., whether one or more discovery rules require information collected by that discovery agent). Additionally, table 40 may contain information regarding the next scheduled activation of each discovery agent. In other embodiments of the invention, the active status of each discovery agent and the next scheduled activation time for each discovery agent is stored in a separate table, register, or other storage mechanism accessible by the discovery engine.

FIG. 4 illustrates an embodiment of a table of discovery rules 42 identifying various discovery rules and the data required to execute those discovery rules. For example, a discovery rule entitled "DiskDriveStatus" requires data related to the disk capacity and the unused disk space to execute the discovery rule. Thus, based on the discovery agents listed in FIG. 3, the DiskDriveStatus discovery rule can be executed using data collected by the disk drive information discovery agent. Other discovery rules may require data collected by multiple discovery agents. For example, the discovery rule "SystemStatus" shown in table 42 requires information from the disk drive information discovery agent, the memory information discovery agent, and the active windows discovery agent. Thus, all three agents must be activated to collect the information necessary to execute the SystemStatus discovery rule. The discovery engine uses the information contained in table 42 to determine which discovery agents need to be activated to collect the data required to execute a particular discovery rule.

Figure 5:
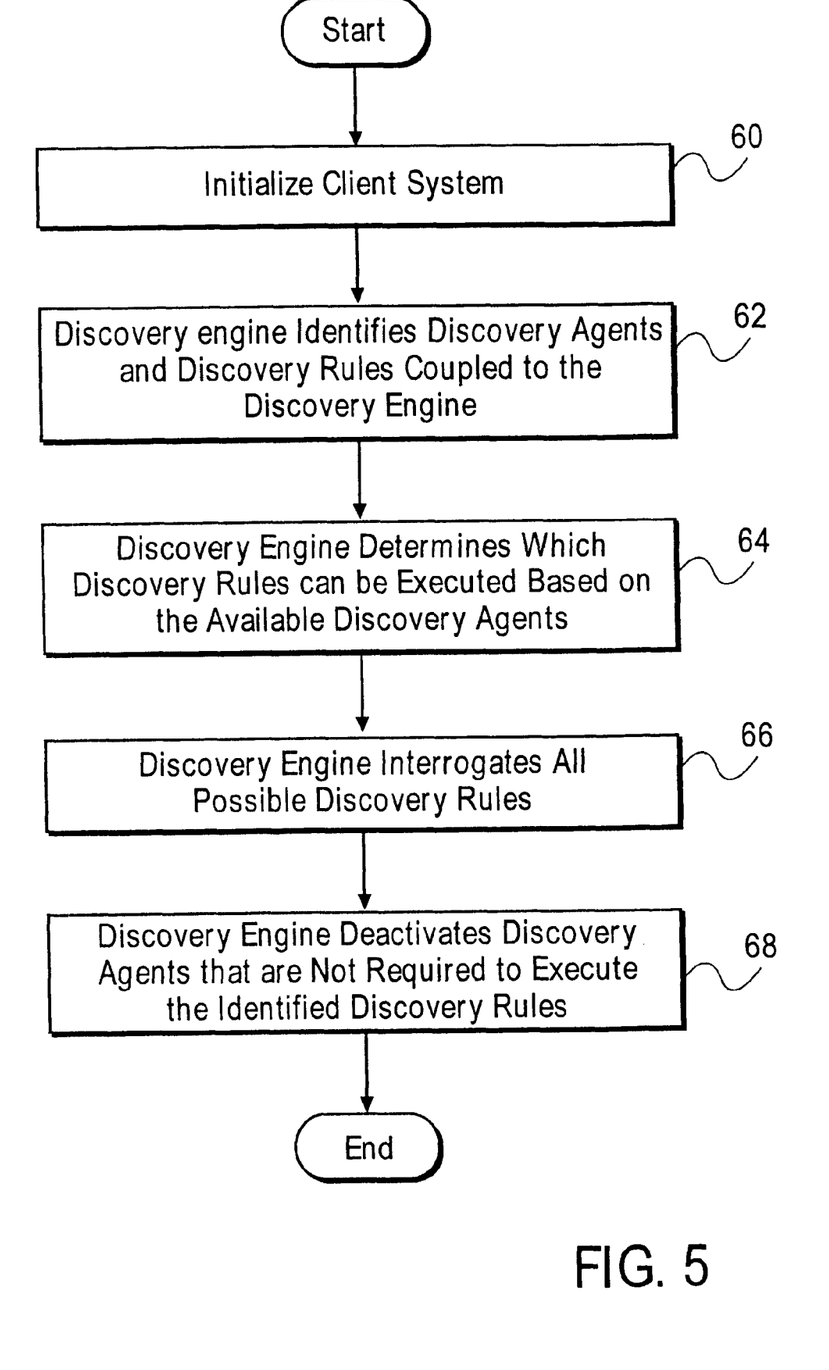
FIG. 5 is a flow diagram illustrating an embodiment of a procedure for initializing an information discovery mechanism on a client system.

FIG. 5 is a flow diagram illustrating an embodiment of a procedure for initializing an information collection system on a client system. At step 60, the client system is initialized. At step 62, the discovery engine identifies discovery agents and discovery rules that are coupled the discovery engine. The discovery agents publish a unique identifier as part of the interface between the discovery agent and the discovery engine. The data collected and provided to the discovery engine is tagged with a unique data identifier. The discovery rules use this same tag to identify the information required to execute the rule.

At step 64, the discovery engine determines which discovery rules can be executed based on the available discovery agents. This determination is performed by identifying the data required to execute a particular discovery rule and determining whether one or more discovery agents are available that can retrieve the required data for the execution of the discovery rule. If a particular discovery rule requires a data element that cannot be retrieved by the available discovery agents, then the discovery rule will be flagged as "inactive" until one or more additional discovery agents are provided to collect the data required to execute the discovery rule. At step 66, the discovery engine interrogates all possible discovery rules to determine the discovery agents required by the discovery rules.

At step 68 of FIG. 5, the discovery engine deactivates the discovery agents that are not required to execute the identified discovery rules. Thus, if information collected by a particular discovery agent is not used by any of the active discovery rules, then the discovery engine does not activate the discovery agent, thereby minimizing the unnecessary use of system resources. The procedure discussed above with respect to FIG. 5 may be performed each time a new discovery agent or discovery rule is added to a device. Thus, the system maintains a current list of available discovery agents and a current list of discovery rules that can be executed using the available discovery agents.

Figure 6:
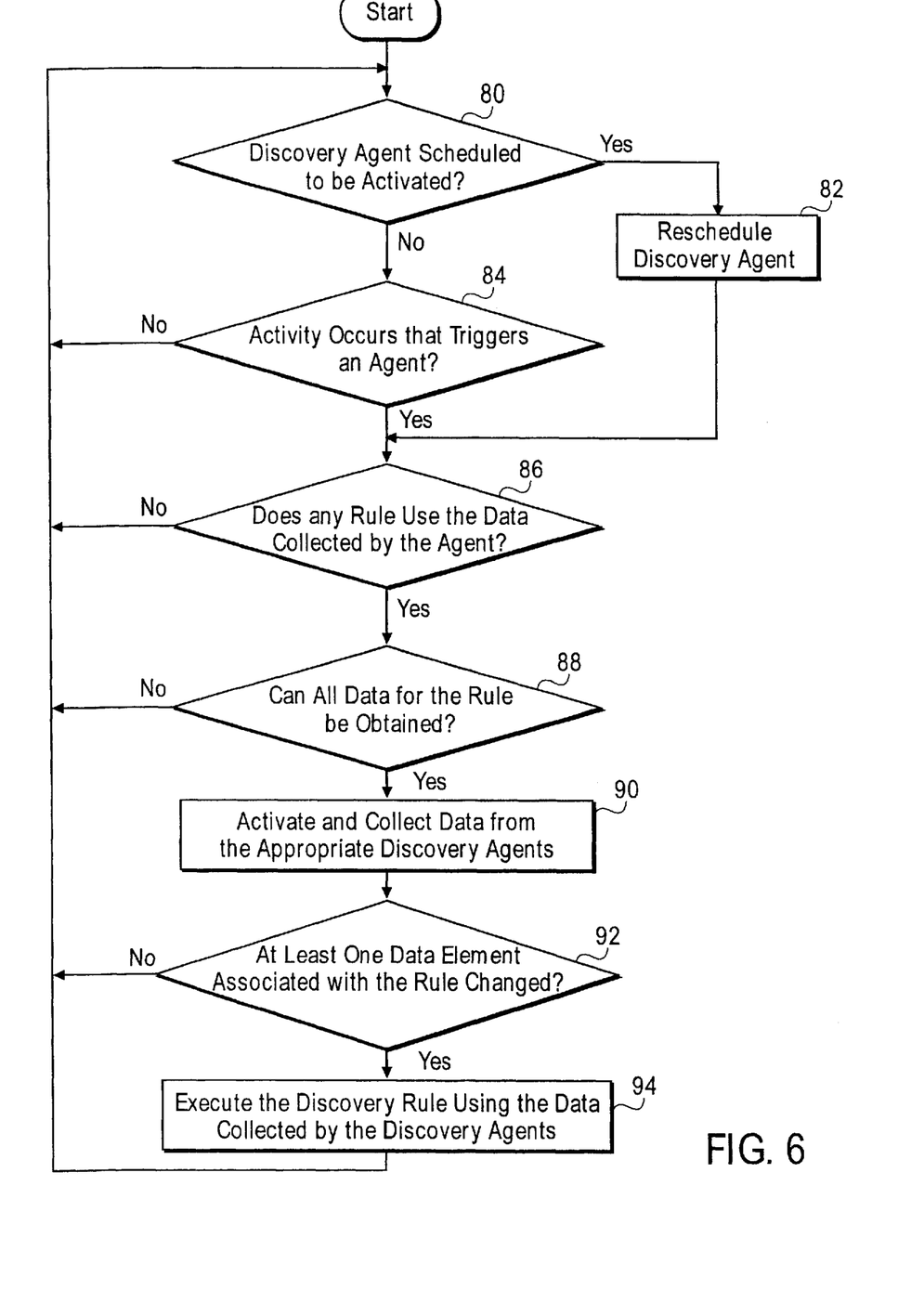
FIG. 6 is a flow diagram illustrating an embodiment of a procedure for handling the activation of discovery agents and the execution of discovery rules.

FIG. 6 is a flow diagram illustrating an embodiment of a procedure for handling the activation of discovery agents and the execution of discovery rules. At step 80, the procedure determines whether a discovery agent is scheduled to be activated. If the agent is scheduled to be activated, then the procedure branches to step 82, where the discovery agent is rescheduled for its next activation, based on the interval between activations. If the discovery agent is not scheduled to be activated, then the procedure continues from step 80 to step 84 to determine whether another activity or event occurred that triggered the activation of a particular discovery agent. If not, the procedure returns to step 80 to repeatedly check for a scheduled activation (step 80) or an activation from another event (step 84).

If step 84 identifies an event or activity that triggers the activation of a discovery agent, the procedure continues to step 86 to determine whether any discovery rule uses the data collected by the discovery agent. If not, the procedure returns to step 80, thereby avoiding the unnecessary activation of a discovery agent. Additionally, a particular discovery agent may be deactivated if the data collected by the agent is not used by any discovery rule. If the data collected by the agent is used by at least one discovery rule, then the procedure continues to step 88 to determine whether all data for the discovery rule can be obtained from the available discovery agents. If not, the procedure returns to step 80 without activating the discovery agents or executing the discovery rule. Additionally, if all data for a particular rule cannot be collected the discovery rule may be flagged "inactive."

At step 90, the procedure activates and collects data from the appropriate discovery agents. The appropriate discovery agents are those agents that are scheduled to be activated, agents activated based on another event, or agents necessary to collect data to execute a particular discovery rule. At step 92, the procedure determines whether at least one data element associated with the discovery rule has changed since the last time the discovery rule was executed. If no data elements have changed since the last time the discovery rule was executed, the rule is not executed again because the result of the rule would not change. If at least one data element has changed, then the procedure continues to step 94, where the discovery rule is executed using the data collected by the discovery agents. The procedure then returns step 80.

In an alternate embodiment of the invention, step 92 of FIG. 6 is not performed by the information collection system. In this embodiment, the data is received from the discovery agents and used by the discovery rules without determining whether a change in the data occurred since the last execution of the discovery agent. In this embodiment, the discovery engine need not analyze or otherwise compare data collected by the discovery agents. Instead, the discovery engine merely receives data collected by the discovery agents and provides the data to the discovery rules.

Although not shown in FIG. 6, the discovery agents and discovery rules may be updated periodically by one or more servers or other software distribution mechanisms. This updating allows the discovery agents and the discovery rules to be updated independently of one another. As discussed above, the discovery agents are not associated with a particular discovery rule, and the updating of an agent does not directly affect the content of any of the discovery rules. Similarly, the updating of one or more discovery rules does not directly affect the content of any of the discovery agents. The various steps illustrated in FIG. 6 and described above may be performed by a discovery engine of the type discussed above with respect to FIGS. 1 and 2.

The procedure discussed above with respect to FIG. 6 refers to a discovery rule. However, embodiments of the invention may perform the procedure illustrated in FIG. 6 on several discovery rules simultaneously. For example, step 88 may determine whether all data for several discovery rules can be obtained from the available agents. If all data cannot be obtained, then the system executes only those rules for which the required data can be collected.

Figure 7:
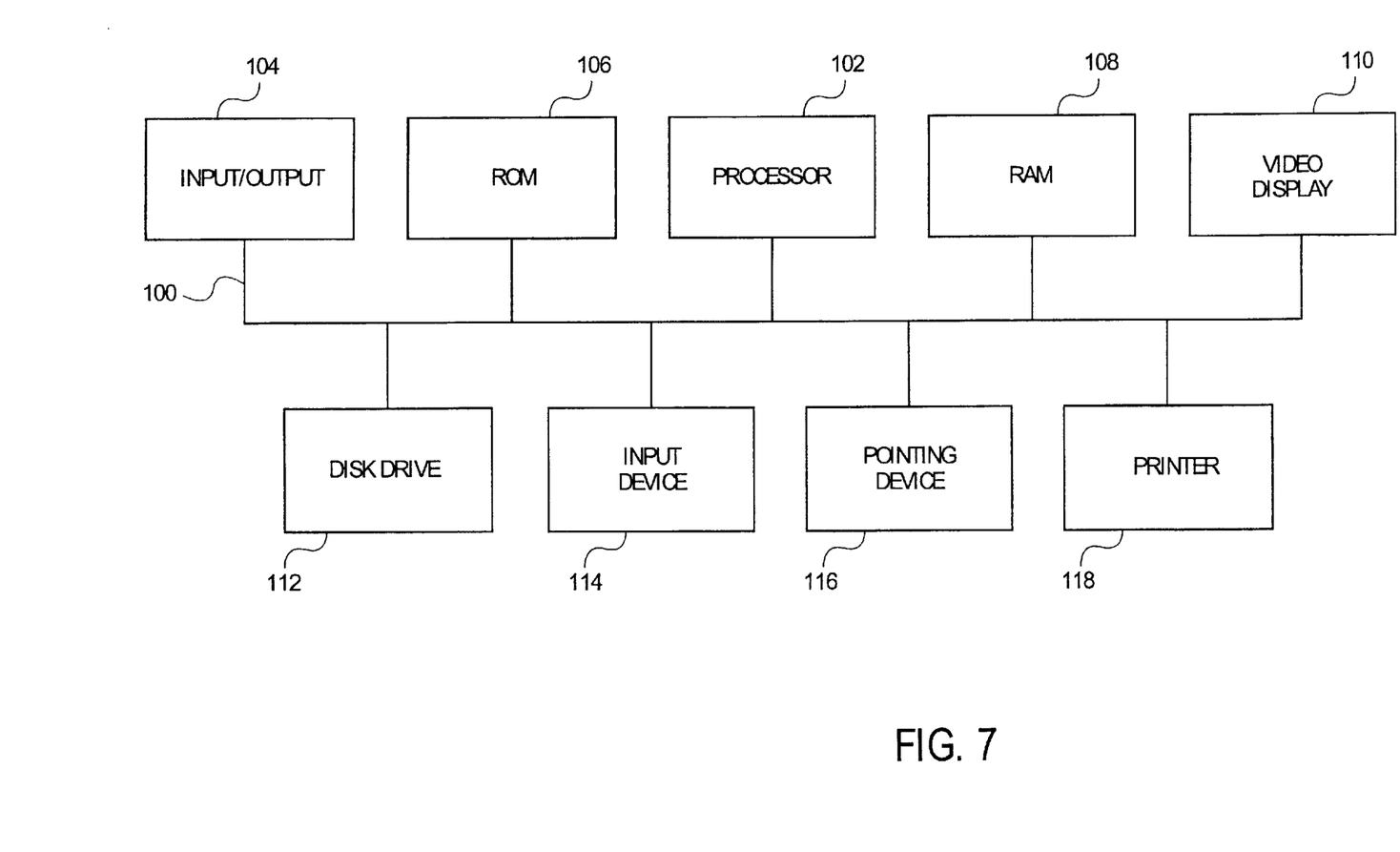
FIG. 7 illustrates an embodiment of a computer system that can be used with the present invention.

FIG. 7 illustrates an embodiment of a computer system that can be used with the present invention. For example, embodiments of the invention may use a computer of the type shown in FIG. 7 as a client and/or a server. The various components in FIG. 7 are provided by way of example. Certain components of the computer in FIG. 7 can be deleted for particular implementations of the invention. The computer system shown in FIG. 7 may be any type of computer, including a general purpose computer.

FIG. 7 illustrates a system bus 100 to which various components and devices are coupled. A processor 102 performs the processing tasks required by the computer. Processor 102 may be any type of processing device capable of implementing the steps necessary to perform the various procedures and operations discussed above. An Input/Output (I/O) device 104 is coupled to bus 100 and provides a mechanism for communicating with other devices coupled to the computer. A Read-Only Memory (ROM) 106 and a Random Access Memory (RAM) 108 are coupled to bus 100 and provide a storage mechanism for various data and information used by the computer. Although ROM 106 and RAM 108 are shown coupled to bus 100, in alternate embodiments, ROM 106 and RAM 108 are coupled directly to processor 102 or coupled to a dedicated memory bus (not shown).

A video display 110 is coupled to bus 100 and displays various information and data to the user of the computer. A disk drive 112 is coupled to bus 100 and provides a mechanism for the long-term mass storage of information. An input device 114 and a pointing device 116 are also coupled to bus 100 and allow the user of the computer to enter information and commands to the computer system. Input device 114 may be, for example, a keyboard, keypad, handwriting recognition device, or voice recognition device. Pointing device 116 includes, for example, a mouse, track ball, or touch pad. A printer 118 is coupled to bus 100 and is capable of creating a hard copy of information generated by or used by the computer.

Embodiments of the present invention may be implemented using a computer-readable medium (also referred to as a processor-readable medium) containing various sets of instructions, code sequences, configuration information, and other data used by a computer or other processing device. The various information stored on the computer-readable medium is used to perform various data communication, data processing, data collection, and data handling operations, such as those described above. The computer-readable medium may be any type of magnetic, optical, or electrical storage medium including a diskette, magnetic tape, CD-ROM, memory device, or other storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of collecting information, the method comprising:

transmitting a discovery rule across a communication link to a computer system, wherein the discovery rule is to be applied to data about the computer system or a user to generate information, and wherein the data is collected by a discovery agent located in the computer system, and receiving the information from the computer system.

2. The method of claim 1, further including receiving a user request prior to transmitting the discovery rule and wherein the transmitting the discovery rule is without requiring action by the user.

3. The method of claim 2, wherein the user request is for assistance regarding the computer system.

4. The method of claim 2, wherein the transmitting of the discovery rule is from a remote individual receiving the user request.

5. The method of claim 2, further including providing assistance to the user regarding the computer system after receiving the information.

6. The method of claim 1, wherein the discovery rule is transmitted automatically when the computer system establishes a connection with a server.

7. The method of claim 1, further including transmitting the discovery agent across the communication link to the computer system and the discovery agent and discovery rule are separate code sequences.

8. The method of claim 1, wherein the discovery agent is activated to collect the data when the discovery rule requires the data.

9. The method of claim 1, wherein the discovery agent is activated to collect the data according to a schedule.

10. The method of claim 1, wherein the discovery agent passively collects the data.

11. In a computer system, method of collecting information comprising:

receiving a discovery rule across a communication link from a sender, applying the discovery rule to data about the computer system or a user to generate information, and wherein the data is collected by a discovery agent located in the computer system when the discovery agent is activated and without requiring action by the user; and communicating the information across the communication link back to the sender of the discovery rule.

12. The method of claim 11, further including making a user request regarding the computer system and the receiving of the discovery rule is in response to the request.

13. The method of claim 12, wherein the user request is for assistance regarding the computer system.

14. The method of claim 12, wherein the user request is made to a remote individual sender of the discovery rule.

15. The method of claim 13, further including receiving assistance regarding the computer system after communicating the information.

16. The method of claim 11, further including receiving the discovery agent across the communication link and the discovery agent and discovery rule are separate code sequences.

17. The method of claim 11, wherein the discovery agent is activated to collect the data when the discovery rule requires the data.

18. The method of claim 11, wherein the discovery agent is activated to collect the data according to a schedule.

19. The method of claim 11, wherein the discovery agent passively collects the data.

20. A method of collecting information, the method comprising:

receiving a user request regarding the computer system;

transmitting a discovery rule across a communication link to a computer system, wherein the discovery rule is to be applied to data about the computer system or a user to generate information, and wherein the data is collected by a discovery agent located in the computer system when the discovery agent is actuated and without requiring action by the user;

receiving the information from the computer system; and providing the user with a response to the user request.

21. The method of claim 20, wherein the user request is for assistance regarding the computer system.

22. The method of claim 21, further including providing assistance to the user regarding the computer system after receiving the information.

23. The method of claim 20, wherein the transmitting of the discovery rule is from a remote individual receiving the user request.

24. The method of claim 20, wherein the discovery rule is transmitted automatically when the computer system establishes a connection with a server.

25. The method of claim 20, further including transmitting the discovery agent across the communication link to the computer system and the discovery agent and discovery rule are separate code sequences.

26. The method of claim 20, wherein the discovery agent is activated to collect the data when the discovery rule requires the data.

27. The method of claim 20, wherein the discovery agent is activated to collect the data according to a schedule.

28. The method of claim 20, wherein the discovery agent passively collects the data.

29. A computer readable medium having stored therein a plurality of sequences of executable instructions, which, when executed by a processor, cause the system to:

transmit a discovery rule across a communication link to a computer system, wherein the discovery rule is to be applied to data about the computer system or a user to generate information, and wherein the data is collected by a discovery agent located in the computer system, and receive the information from the computer system.

30. The computer readable medium of claim 29, further including additional sequences of executable instructions, which when executed by the processor further cause the system to receive a user request prior to transmitting the discovery rule and wherein the transmitting the discovery rule is without requiring action by the user.

31. The computer readable medium of claim 30, wherein the user request is for assistance regarding the computer system.

32. The computer readable medium of claim 29, wherein the transmitting of the discovery rule is from a remote individual receiving the user request.

33. The computer readable medium of claim 29, further including additional sequences of executable instructions, which when executed by the processor further cause the system to provide assistance to the user regarding the computer system after receiving the information.

34. The computer readable medium of claim 29, wherein the discovery rule is transmitted automatically when the computer system establishes a connection with a server.

35. The computer readable medium of claim 29, further including additional sequences of executable instructions, which when executed by the processor further cause the system to transmit the discovery agent across the communication link to the computer system and the discovery agent and discovery rule are separate code sequences.

36. The computer readable medium of claim 29, wherein the discovery agent is activated to collect the data when the discovery rule requires the data.

37. The computer readable medium of claim 29, wherein the discovery agent is activated to collect the data according to a schedule.

38. The computer readable medium of claim 29, wherein the discovery agent passively collects the data.

39. A computer readable medium having stored therein a plurality of sequences of executable instructions, which when executed by a processor, cause the system to:
   receive a discovery rule across a communication link from a sender, apply the discovery rule to data about the computer system or a user to generate information, and wherein the data is collected by a discovery agent located in the computer system when the discovery agent is activated and without requiring action by the user; and
   communicate the information across the communication link back to the sender of the discovery rule.

40. The computer readable medium of claim 39, further including making a user request regarding the computer system and the receiving of the discovery rule is in response to the user request.

41. The computer readable medium of claim 40, wherein the user request is for assistance regarding the computer system.

42. The computer readable medium of claim 40, wherein the user request is made to a remote individual sender of the discovery rule.

43. The computer readable medium of claim 41, further including receiving assistance regarding the computer system after communicating the information.

44. The computer readable medium of claim 39, further including receiving the discovery agent across the communication link and the discovery agent and discovery rule are separate code sequences.

45. The computer readable medium of claim 39, wherein the discovery agent is activated to collect the data when the discovery rule requires the data.

46. The computer readable medium of claim 39, wherein the discovery agent is activated to collect the data according to a schedule.

47. The computer readable medium of claim 39, wherein the discovery agent passively collects the data.

* * * * *